UNITED STATES PATENT OFFICE.

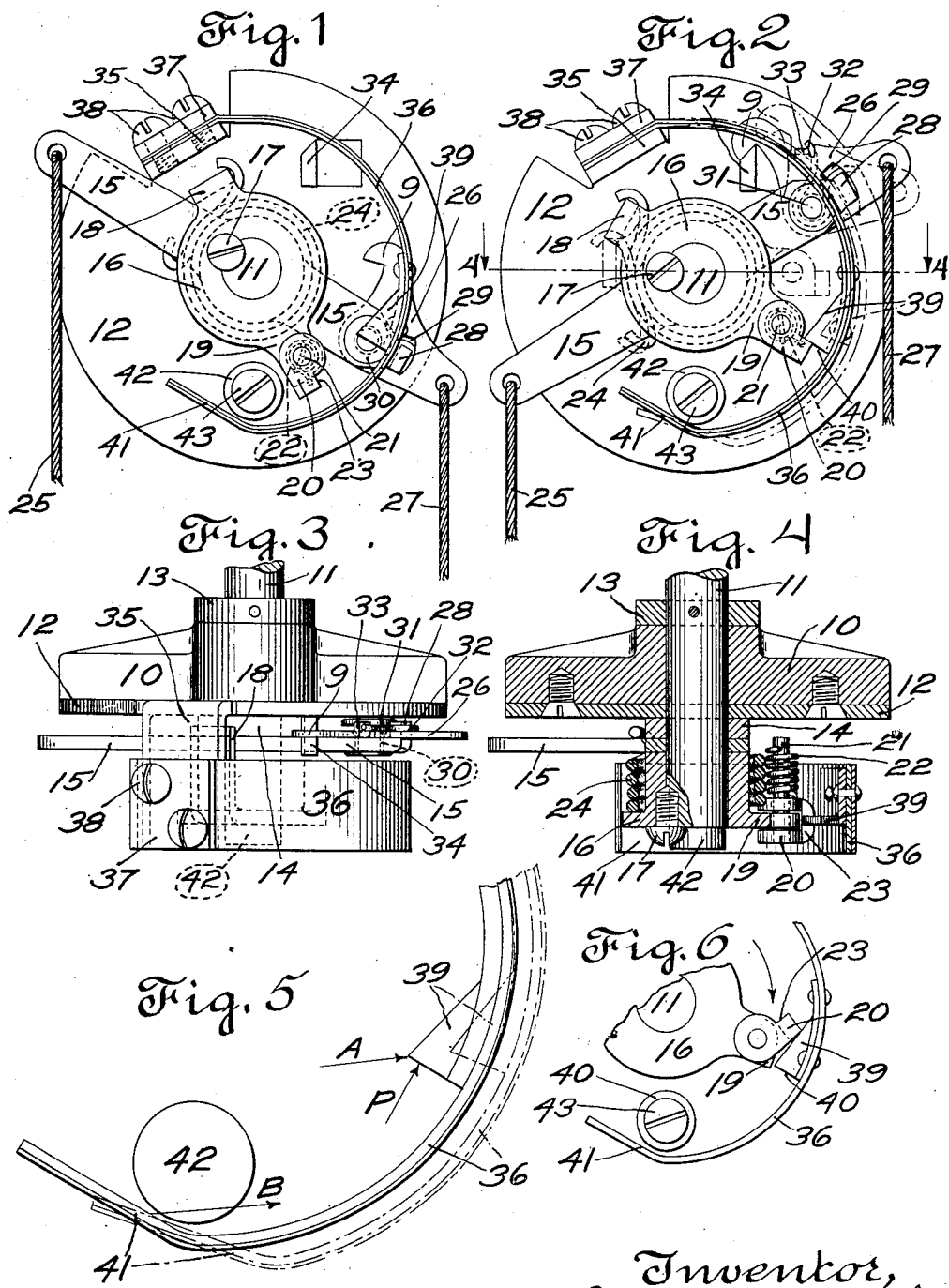

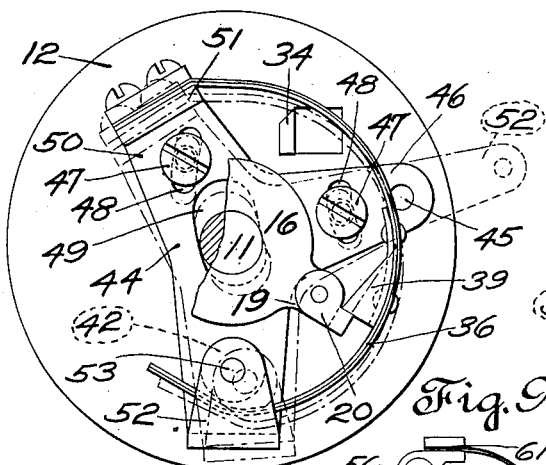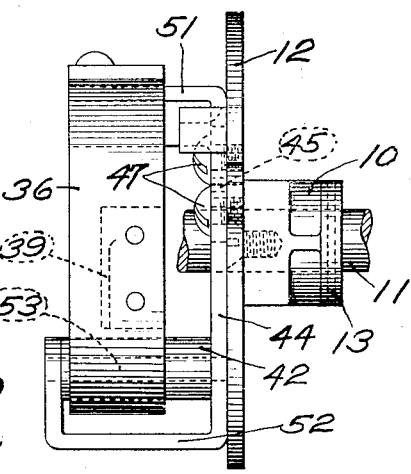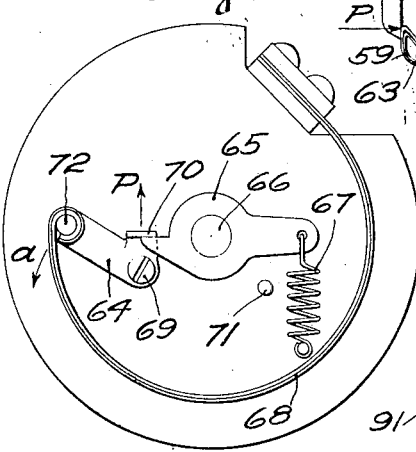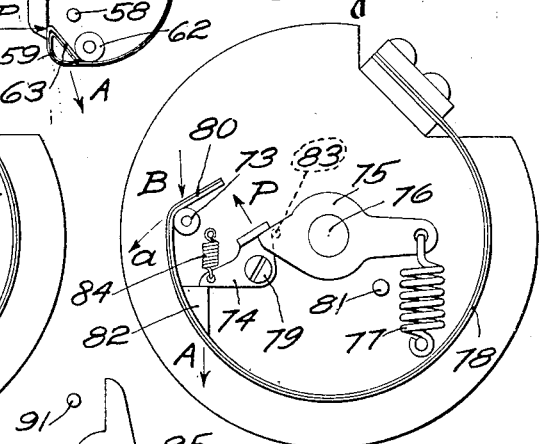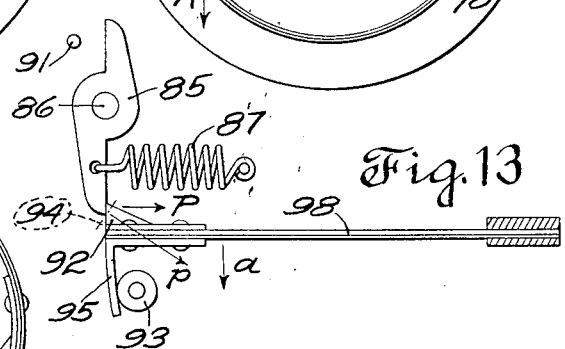

RAYMOND D. SMITH, OF MILTON, MASSACHUSETTS, ASSIGNOR TO TREMONT PRODUCTS COMPANY, OF BOSTON, MASSACHUSETTS, A CORPORATION OF MASSACHUSETTS.

THERMOSTATICALLY-CONTROLLED DEVICE.

1,350,573.  Specification of Letters Patent.  Patented Aug. 24, 1920.

Application filed July 24, 1916, Serial No. 110,952. Renewed November 17, 1919. Serial No. 338,532.

*To all whom it may concern:*

Be it known that I, RAYMOND D. SMITH, a citizen of the United States, residing at Milton, in the county of Suffolk and State of Massachusetts, have invented certain new and useful Improvements in Thermostatically-Controlled Devices, of which the following is a specification.

My present invention relates to thermostatically controlled devices and particularly to that type of device wherein the controlling agent is a single, multi-metallic or laminated thermostat.

The object of my invention is, in general, to provide a thermostatically controlled device, embodying a bi-metallic, and therefore flexing, thermostat, in which by novel arrangement of the thermostatic structure and its coöperating parts, the former shall act as a self-contained detent to control a heavily tensioned movable member, under conditions where a relatively light, or limber thermostat must receive the relatively heavy thrust or load of said movable member and release the latter through thermally caused flexure, so that desired movement of said movable member may be had at a predetermined time; the thermostat being so related to the tensioned movable member in position, and flexural rigidity, that although capable of restraining and releasing said member in the usual way when the latter is normally loaded, it will yield under increased load sufficiently to be inoperative as a controlling agent when subjected to such excessive load.

A further object of my invention is to provide in a thermostatically controlled device of the above cited nature, reinforcing means, coöperating with the thermostatic structure in a free portion thereof, to help the thermostat resist the pressure of the heavily tensioned member without impairing the thermally caused movement of the thermostat in releasing said member.

Laminated, multi-metallic thermostats have been heretofore used in various ways for controlling various mechanical movements and for making and breaking electric circuits. The common principle involved in their heat-caused movement is the flexure caused by the unequal expansion or contraction of different metals fastened together and comprising the lamina, when subjected to the same change in temperature.

It is well known that the degree of thermally caused flexure of a bi-metallic thermostat is related to its thickness, to the relative thicknesses of the component metal strips, to its length, and to the amount of thermal change. Limitations of space and convenience of arrangement, however, frequently necessitate or render advantageous a short thermostat, and one to produce an appreciable amount of movement under moderate thermal change. Under such conditions, (since degree of flexure is otherwise related to thickness), a relatively thin, and therefore weak thermostat has to be employed to obtain from the thermally caused flexure thereof enough movement to be of practical use as a controlling agent in the manner desired. It may, nevertheless, be desired to control by this thermostat a relatively heavy load — so heavy that, borne by the thermostat directly, the latter is rendered inoperative for the desired purpose by excessive yielding under load. Or, if the thermostat be so constrained as to effectually remedy this structural weakness, it may be found that the friction between contact surfaces at the point where the thermostat bears its load is so great that the movement of the thermostat is prevented at this point, in which case the thermally caused movement of the thermostat would be dissipated as distortion in other portions of the thermostat, and would not be operative at the desired point, and in the desired manner, to control the loaded member.

In general, it has heretofore been found difficult to cause a thermostat of the kind under consideration to do much actual work, by thermally caused movement, it being found necessary either to sacrifice rigidity for amount of movement, or vice versa.

The coöperative organization I have provided effectually overcomes such difficulties;—my invention providing means whereby desired free thermally caused movement may be retained, but wherein the thermostat structure in its free portion is reliably reinforced in the direction of the thrust or load communicated by the controlled member. My invention also provides an arrangement whereby the thrust or pressure imposed upon the thermostat by the heavily loaded controlled member tends to cause a partial yielding of the thermostat such that this yielding movement is approximately similar (in direction of displacement) to its thermally caused movement that in normal operation releases the controlled member.

It will be evident from this consideration that, here, the actual work required of the thermostat in overcoming any friction between contact surfaces due to the pressure thereupon of the heavily loaded controlled member is lessened. In other words, the thermally caused movement of the limber thermostat against friction is helped by the pressure upon it of the heavily loaded controlled member.

Details of my invention reside in the provision of simple and convenient means for manual or other control of the device; and comprise, among others, the arrangements for manually operating the device, for locking the parts, and for protecting the thermostat in the operation of the device.

I have herein illustrated as a preferred embodiment of my invention a device in which the member to be controlled is an oscillating element adapted to be put under spring tension for movement in one direction, such movement to be restrained and controlled by the thermostat;—the embodiment having a convenient and compact organization through a curved form of thermostat disposed about the center of oscillation of the controlled member. But, as will appear from the description and claims herein, my invention is not limited in its scope to such form of embodiment.

In the drawings:—Figure 1 is a front elevation of my thermostatically controlled device as a whole; Fig. 2 is a similar view showing the various parts in different positions which they occupy in operation; Fig. 3 is a plan view of the device with parts positioned as in Fig. 2; Fig. 4 is a horizontal section taken on the plane 4—4 in Fig. 2; Fig. 5 is an enlarged diagrammatic view of the thermostat's free portion, being explanatory of forces acting and of movement involved in its operation; Fig. 6 is a fragmentary view of certain parts in a certain relative position; Fig. 7 shows a modification of part of the device whereby certain useful advantages may be obtained; Fig. 8 is an elevation looking at the right of Fig. 7, certain parts being omitted for clearness; Fig. 9 represents diagrammatically a materially different arrangement of parts in which the principles of my invention may be utilized; Fig. 10, also diagrammatic, shows a still different organization explanatory of difficulties which may be overcome by my invention; Fig. 11 diagrammatically shows an arrangement within the spirit of my invention whereby these difficulties may be overcome; Fig. 12 shows a possible modification in detail of the thermostatic structure shown in Fig. 1; and Fig. 13 is a diagrammatic view of a straight thermostat and corresponding parts arranged to derive the advantages which reside in my invention.

In the various views similar parts are designated by similar numerals, and in the diagrammatic figures, arrows denoting corresponding forces or directions of movement are designated by similar letters.

In Figs. 1–4 inclusive, the frame of the device is indicated as a block 10 which affords a bearing for a shaft 11 and which carries fixed to it a supporting plate 12. The shaft 11 is retained in its bearing by a collar 13 pinned thereto, and carries at the other side of its bearing a loose spacing collar 14, a loose, double-ended, oscillatory control lever 15, and a double-extensional member 16, having a hub which by means of a key screw 17, is made fast to the shaft as shown clearly in Fig. 4. The shaft 11 and its extension member 16 together will be termed the controlled member and movement of such shaft could, by suitable connections to its free end, which in the Figs. 3 and 4 is shown broken away, be made to serve various useful purposes, such as to control a rotary valve and thereby the passage of fluids, or to make or break electric currents, or to control various mechanisms.

One extension 18 of the controlled member 16 is bent backwardly parallel with its axis of oscillation so as to engage with the lever 15. The other extension 19 lies diametrically opposite and carries a latch device comprising a yoked latch member 20, which straddles the extremity of extension 19 and which is pivoted thereto by a stud 21. The stud 21 is fast in the extension 19 but loose in the yoked latch member 20, so that the latter is free to turn in one direction against the tension of a fine wire spring 22 which is loosely coiled about the stud 21, and at one end fastened thereto. The other end of this spring 22 engages the latch member 20 so as normally to maintain the latter positioned against a seat provided by the very extremity of the extension 19. This normal position of the latch member 20 is shown in Figs. 1 and 2. It should be noted that in this position the face 23 of the latch member falls in radial alinement with the center of oscillation of the controlled member. A position of this latch, other than normal relative to the extension 19, is shown in Fig. 6, which will be hereinafter referred to.

A helical wire spring 24, loosely coiled about the hub of controlled member 16 is at one end hooked under an edge of the lever 15 and at the other end engages with the extension 18 of the controlled member 16. It will be evident that the lever 15 and the extension 18 are thus held in contact by the tension of this spring so that normally the controlled member 16 and the lever 15 are maintained in the relative rotative positions indicated in Fig. 1. Of course, if desired, the helical wire spring 24 may be replaced by a spiral, ribbon spring to serve the same function, the latter being a well-known equivalent in this type of construction.

One end of the lever 15 carries a control cord 25 attached directly thereto. At the other end, a latch lever 26 is pivoted for purposes to be hereinafter described. The latch lever 26 is double-ended, and of bell-crank shape. One portion, terminating in a catch formation 9, extends substantially tangential to the arc described by its pivot moving with the control lever 15, and the other portion forms virtually a radial continuation of the lever 15 and carries at its extremity the control cord 27.

The extremity 28 of the control lever 15 is bent sharply at right angles and projects through a curved slot 29 in the latch lever 26, the ends of this slot acting as stops to limit the swinging movement of the latch lever about its pivot 30. In construction this pivot comprises an eyelet, or hollow rivet, 30, made fast in the latch lever 26, but having a loose bearing in the control lever 15. The hollow center of this eyelet is utilized for mounting therein, and concentrically with the pivot, a spring stud 31 which retains a light wire spring 32. The spring 32 bears against the bent extremity 28 of the lever 15 and on a projection 33 of the latch lever 26 in such way as to normally keep the latch lever in the full line position indicated in Figs. 1 and 2, but so that a pull on control cord 27 will swing the latch lever to the broken line position indicated in Fig. 2. A projection 34 of the supporting plate 12 is so positioned as to be suitably engaged by the latch lever 26 at certain times, its position and shape being so related to the path of movement of the lever 15 and of the latch lever 26 and also to the shape of the engaging portion of the latter, as to produce a smooth automatic locking of the control lever 15 in the position shown in Fig. 2 whenever the control lever is caused to assume that position.

It will be evident that the projection 34 of the supporting plate 12 also serves as a positive stop for the control lever 15 and that unlocking of this control lever can be accomplished only by swinging latch lever 26 to the broken line position in Fig. 2. It will also be evident from the arrangement of parts that no rotative tendency of the control lever will be effective to accomplish this unlocking, but that a slight pull on cord 27 will disengage the latch lever 26 from the projection 34, and then that further pull on cord 27 will be positively transmitted to the control lever.

Another projection 35 of the supporting plate 12 acts as a positive stop to limit the movement of lever 15 in the opposite direction, to the position shown in Fig. 1. This projection 35 extends forwardly, parallel to the axis of oscillation of the controlled member, and affords an abutment to which one end of a curved bi-metallic thermostat 36 is clamped by means of a clamping plate 37 and screws 38.

This thermostat, in the plane of its least dimension, conforms for the most part to the arc of a true circle, substantially but not necessarily, concentric with the axis of oscillation of the controlled member, and comprises two conformed strips of different metals having widely different expansible properties such as brass and steel securely, and preferably uniformly, fastened together by any conventional process.

Some distance from its point of anchorage the thermostat carries on its inner face and securely fastened to it, a spur 39 inwardly extending, one edge 40, of which falls in radial alinement with the center of oscillation of the controlled member, and another edge of which slopes gradually back to the inner face of the thermostat. At its free end 41, the curvature of the thermostat departs from conformation to the arc of a true circle and extends somewhat more inwardly for a purpose to be made clear hereinafter.

Internally adjacent to and nearly in contact with this inwardly curved extremity of the thermostat is a loose roller 42 carried by a stud which is mounted upon the supporting plate 12. A retaining screw 43 serves to keep the roller in place.

I shall now describe the mechanical operation of the parts heretofore mentioned before discussing in detail the more complex considerations involved in the thermostat's action.

Starting with the parts in the position shown in Fig. 1, initially, no appreciable resistance will be offered to a pull on cord 25 since both control lever 15 and controlled member 16 are free to swing in unison. A continued pull on this cord, however, will swing the face 23 of latch member 20 into contact with the edge 40 of the thermostat spur 39 as shown clearly in Fig. 2. This engagement will intercept further movement of the controlled member 16 since the latch member 20 is non-yielding in the direction of pressure under these conditions. However, the lever 15 may now be swung farther against the tension of spring 24 until it is automatically locked in the position shown in Fig. 2 by the latch lever 26 as previously described. Parts will now remain as shown in Fig. 2 until by a change in temperature of the thermostat 36, the latter bends outwardly, or tends generally to straighten and assume the broken line position in Fig. 2

In this position the thermostat spur 39 has been retracted to a position where it is out of the path of movement of the latch 22 and therefore, impelled by the spring 24, the controlled member will swing to its normal position relative to the control lever 15 or to the absolute position shown by broken lines in Fig. 2. From this position, a pull on the control cord 27 will first disengage the latch lever 26 from projection 34 and then positively swing control lever 15 and controlled member 16 clockwise in Fig. 2 until the parts are restored to a position as in Fig. 1.

If before this latter swinging movement the thermostat has been restored to its normal temperature, and therefore to its original position, the latch member 20 will yield as indicated in Fig. 6 and by so yielding will wipe by the spur 39 without imposing upon the thermostat any detrimental stresses. Although a thermostat of this nature possesses considerable elasticity and is in fact a virtual leaf spring, and although for this reason a non-yielding extension might be used in place of the spring latch 20, in which case the thermostat would yield outwardly to allow the passage of this extension when the latter is swinging clockwise in Fig. 6, there are considerations which would make the omission of the yielding latch 20 undesirable in practice. One of these is that sliding friction between the swinging extension and the sloping surface of the thermostat spur 39, even though very slight, may be sufficient to cause a gripping of the latter by the former and a forced movement of the spur downwardly to an extent in which the elastic limit of the thermostat is exceeded, which would result in permanent distortion of the thermostat.

I shall now point out in detail the nature of the thermostat's action under the conditions of operation heretofore described and will then discuss some of the various modifications in arrangement of both thermostat and coöperative parts, by which the advantages of my invention may be obtained.

I have purposely refrained from specifying a way in which the temperature of the thermostat shall be changed, as it does not concern my present invention. A change in temperature of the medium, such as air, which surrounds the thermostatic structure would, for instance, cause a change in the temperature of the thermostat. Neither have I stated whether a rise or fall in temperature of the thermostat shall be effective to cause the out-bending or straightening represented in Fig. 2. That also is immaterial and of course dependent upon the arrangement of the different expansible metallic strips, composing the thermostat.

In Fig. 5, the full lines indicate the normal position of the free portion of the thermostat. The broken line position represents that position which this free portion of the thermostat would tend to assume upon subjection of the thermostat as a whole to substantially the same change in temperature. It will be noted that in neither of these positions is the thermostat in actual contact with the roller 42.

In Fig. 5, arrow P represents the direction of pressure of the latch members 20 upon the thermostat spur 39 when the parts are positioned as in Fig. 2. Arrow A indicates the direction of movement of the spur 39 due to the partial yielding of the thermostat under this pressure, and it will be noted by referring to the broken line position of this detent that thermally caused flexure of the thermostat also moves the spur 39 substantially in the direction of arrow A. Arrow B indicates the general direction in which the portion 41 of the thermostat would be caused to move by said yielding of the thermostat due to the pressure P. Here, however, it should be observed that the direction of movement indicated by arrow B is not substantially the same as that in which this part of the thermostat moves by thermally caused flexure, as will be clear by reference to the broken line position of this part of the thermostat.

The result of the foregoing condition is, that upon subjection to the pressure P, or when the parts are caused to assume the positions as in Fig. 2, the thermostat yields slightly, spur 39 and free end 41 moving in the direction of arrows A and B respectively, until the part 41 of the thermostat encounters the roller 42, as shown in Fig. 2. The reinforcement thus provided assists the thermostat to bear its load and the parts will remain in their tensioned positions shown in Fig. 2 until further mechanically or thermally caused flexure of the thermostat outwardly causes the disengagement of spur 39 from latch member 20. Such thermally caused flexure is not positionally opposed or prevented by the roller 42, since, as is clearly shown in Fig. 5, the nature of this flexure is, without load, such as to maintain a substantially constant clearance between the roller 42 and the portion 41 of the thermostat.

The use of a roller as a reinforcing abutment serves to minimize any frictional opposition due to pressure between such reinforcing abutment and the thermostat when the latter, through thermally caused flexure, moves from the full line position to the broken line position in Fig. 2. The antifrictional nature of this reinforcing abutment is, however, a matter of preference rather than a vital necessity in the operation of the device and might be dispensed with.

Appreciable friction may, however, exist between the surface 23 of latch member 20 and the edge 40 of thermostat spur 39. Such friction opposes the thermally caused outward movement of the spur 39 to disengagement. The advantage of an arrangement of parts wherein the pressure of the controlled member tends to cause yielding of the thermostat spur in the direction which it must move for disengagement, is thus made apparent, for without this tendency, more work would be required of the thermostat in overcoming said opposing friction. Another advantage of such an organization is that if an excessive load be exerted upon the controlled member and thereby upon the thermostat, the latter by virtue of its characteristic previously described will yield, within its elastic limits, as a leaf spring, to permit the disengagement of the spur 39 from the controlled member, without the introduction of thermal change in the thermostat.

There are many possible modifications in arrangement and form of parts in which the advantages of my present invention may be embodied. I have herein illustrated and will now describe some examples.

In Figs. 7 and 8 the thermostat is shown mounted on an adjustable bracket 44 which has three main arms. A dowel pin 45 in one arm 46 of this bracket serves as a pivot about which the bracket 44 may swing in adjustment, and screws 47, 47 clamp the bracket in the desired position. Curved, elongated slots 48, 48 through which screws 41, 41 pass permit limited adjustment of the bracket; and a larger, similarly curved slot 49 affords an opening through which the controlled shaft 11 may pass.

The bent arm 50 of this bracket affords an abutment 51 to which the thermostat is clamped in the usual way, and another arm 52 (bent U-shaped) carries a pin 53 which serves as a pivot for the roller 42. The arm 46 may be extended as shown at 52 in broken lines in Fig. 7 for more convenient control in adjustment of the bracket, or may be utilized for operation of the bracket for purposes to be referred to hereinafter.

The broken line position of the adjustable bracket and the thermostatic structure which it carries (comprising the thermostat 36 and its reinforcing roller 42 normally in fixed relative position), shows how adjustment of the bracket directly affects the amount of engagement between latch member 20 and the thermostat spur 29. Such adjustment of this engagement may be utilized in assembling to compensate for variations in the different parts. Or such ability of adjustment may be used for predetermining the time of the thermostatically caused release of the controlled member 16. Or, by suitable connections to the extension 52 and by the introduction of resilient means for normally maintaining the bracket 44 in a position giving desired depth of engagement between the latch member 20 and the thermostat spur 39, the mobility of the thermostatic structure as a whole may be utilized as a means for effecting disengagement at will of the parts 20 and 39. Obviously another means for adjusting the amount of engagement of the thermostat spur with the latch member 20 could be provided by mounting the latter so as to be radially adjustable on the member 16 relative to the axis of oscillation of the latter.

In Fig. 9, the controlled member is designated as a lever 55 pivoted at 56 and is shown impelled in the direction of arrow P by the tension in spring 57. A stop 58 for the lever 55 is indicated, but in the figure the lever 55 is shown intercepted by the bent end 59 of the thermostat 60. One end of the thermostat is securely anchored at 61, the other or bent end being free to move substantially in the direction of arrow A by suitable thermally caused flexure. Internally adjacent to the thermostat near its free end is a roller abutment shown in the figure at 62. The inwardly bent end of the thermostat presents an inclined surface 63 to this roller, the parts being so related that pressure upon the free end of the thermostat in the direction of arrow P, will, by a yielding of the thermostat, tend to produce a movement of the free end of the thermostat also in the direction A. Here it is evident that there exists substantial reinforcement of the thermostat by the roller in the general direction of the load upon it, and a tendency of the thermostat to yield toward disengagement by the virtue of this same load and the coöperating roller abutment, thus lessening the work required of the thermostat in overcoming friction in thermally caused flexure.

In Fig. 10, an additional element is shown between the thermostat 68, and the controlled member 65, in the form of a bell crank lever 64 pivoted at 69 and adapted at the end 70 of one of its arms to engage with an extension of the controlled member 65, which is pivoted at 66 and impelled by a spring 67 to clockwise rotation. At the end of the other arm of lever 64, a hinged connection 72 is made with the free end of a bimetallic thermostat 68, securely anchored at its other end in the usual manner. A stop 71 is provided for the controlled member 65. In this arrangement arrow "$a$" represents substantially the direction of movement imparted to the hinged end of the thermostat at 72 by flexure of the thermostat under suitable thermal change. This direction of movement is ideal for causing most effectively the swinging of the end 70 of bell crank lever 64 out of engagement with the controlled member 65, thus releasing it. Here also the thermostat is relieved of all strain due to the pressure of the controlled member 65 since this pressure is borne entirely by the pivot 69. But, if the tension of spring 67 be heavy, so much friction may exist between the contact surfaces of the controlled member 65 and the lever 64 that the thermostat, by thermally caused flexure will be too weak to swing the lever 64 out of engagement with the controlled member.

Fig. 11, however, shows an application of the principles of my invention which overcome this difficulty and which enable a thermostat 78 similar in dimensions to the thermostat 68 Fig. 10, to effectively control a member 75 which is pivoted at 76 and under tension of a heavy spring 77. I have shown a stop 81 for the controlled member 75, and a bell crank lever 74, corresponding to the lever 64 in Fig. 11 and similarly pivoted at 79. But, here, the lever 74 is somewhat modified, its contact with the extension of the controlled member being such that the pressure exerted upon the former is substantially in the direction indicated by arrow P, or in such direction that an appreciable turning effort is imparted to the lever 74 thereby. The pressure due to this turning effort is borne by a spur 82 carried by the thermostat 78 and the direction of this pressure is subtantially that denoted by arrow A. Arrow A, however, also indicates the direction of movement which would be imparted to the spur 82 by suitable thermally caused flexure of the thermostat. The thermostat 78 alone would not be rigid enough to bear the load imposed upon it, by the pressure A. Reinforcing means, however, may be supplied in the form of a roller abutment 73 which, positioned in suitable relation to an inwardly curved portion 80 of the thermostat 78, will assist the thermostat to bear its load, without impairing the thermally caused flexure of the thermostat in causing a movement of the spur 82 in the direction of arrow A, and thereby out of engagement with the lever 74. When thus released the lever 74 will readily swing counterclockwise, under the turning effort of pressure P, allowing the escapement of the controlled member 75, after which the lever 74 will be immediately returned to its original position against the stop pin 83, by a very light tension in the coiled spring 84, which is made fast to the lever 74 and to the back plate. Arrow B indicates the direction in which the free portion 68 of the thermostat would tend to move under load were it not for roller 73, and arrow A denotes the direction in which this same part would be moved by suitable thermally caused flexure of the thermostat alone. Here again, it will be evident that the restraining parts have an automatic disengaging tendency due to the load imposed upon them by the controlled member, thus helping the thermostat to overcome by thermal action any friction opposing such disengagement.

Fig. 12 shows a modified form of the general thermostatic structure of Figs. 1 to 8 inclusive, in which the free end 41 of the thermostat 36, as far as the spur 39, is monometallic. Such a structure could be made more rigid as a whole, but certain thermostatic qualities, present, for instance, in the structures of Fig. 1, 2, 7, 9 and 11, would be sacrificed for the added rigidity.

In Fig. 13 the controlled member 85 is shown pivoted at 86, provided with a stop 91, and under tension of a coiled spring 87. Engagement is shown with a spur 92 positioned at the free extremity of a straight bi-metallic thermostat 98 anchored securely at its opposite end in the usual manner. The direction of pressure upon the spur is indicated by arrow P. Opposite the spur 92 is a slightly curved extension 95, adjacent to which is situated a roller abutment 93. This abutment assists the thermostat to bear its load without impairing the thermally caused disengaging movement of the spur 92, which is approximately in the direction indicated by arrow A.

If it were desired to help the thermostat overcome friction due to pressure P, this might readily be accomplished by beveling the engaging face of the spur 92 as indicated at 94 by broken line, in which case, the direction of pressure P would be changed as indicated by the arrow $p$. It is clear that such change in the direction of pressure P would be more or less effective to assist thermal flexure of the thermostat in direction D accordingly as to whether such bevel were greater or less.

I might employ a sliding or otherwise movable controlled member in this device, instead of a pivoted member as shown in the drawings, and still utilize the advantageous principles of my invention. A straight thermostat as indicated in Fig. 13 is particularly convenient for thus controlling a member whose path of movement is in a straight line.

The arrangement of parts in Fig. 11 is particularly suitable for controlling a member rotative by stages in one direction only, such as the electrically conductive bar or clip of an ordinary electrical rotary snap switch.

By the term bi-metallic thermostat as used throughout the foregoing description and in the claims, I mean any type of multimetallic or laminated thermostat from which movement may be derived by thermally caused flexure.

Without therefore limiting myself to the present embodiments of my invention, herein shown, which have been selected for illustrative purposes only, what I claim as my invention is:

1. In combination a thermostatically-controlled device embodying a member tensioned for movement and means thereon arranged to engage a movable detent; and a bi-metallic, resilient thermostat rigidly mounted at one end, free of operative restraint to thermally caused movement at its other end, and carrying said detent mounted thereon remote from said mounted end;—the coöperative arrangement of said detent and of the rigidly mounted end of said thermostat relative to the path of movement of said means, and to the direction of pressure thereof on said detent, being such that said pressure tends to cause yielding flexure of said thermostat in a direction to retract said detent from engagement with said means.

2. In combination; a tension-impelled element; and a thermostatic detent adapted to govern the movement thereof responsively to thermal change;—said detent embodying a laminated, thermostatic leaf spring, mounted at one end to an abutment, and having a flexing portion operatively free for thermally caused movement at the other end; and a stop fixedly carried on said flexing portion and positioned to be moved into, and out of, a position to engage with said element;—the coöperative position of said stop and of said abutment relative to the path of movement of said element being such that the pressure of said element on said stop acts in a direction substantially away from said free spring end and in a line tending to cause yielding flexure in said free spring portion in a direction to retract said stop from engagement with said element.

3. Thermostatic detent controlling apparatus embodying in combination, a bi-metallic, resilient thermostat rigidly mounted at one end and operatively free for thermally caused movement at the other end; a detent mounted fixedly on said thermostat; a member tensioned for movement and adapted to engage with said detent and to be restrained thereby,—the coöperative position and arrangement of the thermostat with its said ends, and of said detent, relative to the path of movement of said member, being such that the pressure of said member on said detent tends to cause yielding of said thermostat in a direction to retract said detent from engagement with said member; and a reinforcing arrangement for said thermostat including a stationary support and a coöperative conformation of the thermostat structure, mutually positioned to engage when said detent is subjected to the pressure of said member, thereby to assist the thermostat to resist said pressure.

4. In combination; a tension-impelled element; and a thermostatic detent adapted to govern the movement thereof responsively to thermal change;—said detent embodying a laminated, thermostatic leaf spring, mounted at one end to an abutment, and having a flexing portion operatively free for thermally caused movement at the other end; and a stop fixedly carried on said flexing portion and positioned to be moved thereby into, and out of, a position to engage with said element;—the coöperative position of said stop and of said abutment relative to the path of movement of said element being such that the pressure of said element on said stop acts in a direction substantially away from said free spring end and in a line tending to cause yielding flexure in said free spring portion in a direction to retract said stop from engagement with said element; together with a stationary reinforcing support positioned in constraining relation to an extension of said flexing spring portion, and to be engaged thereby when the detent is subjected to said pressure of the element, thereby to check the pressure-caused flexure in said spring portion.

5. A thermostatically-controlled device comprising, in combination, a shaft mounted for oscillatory movement, with radial extensions to control the same; a radial member fixedly mounted on said shaft and arranged to engage a detent device; a bi-metallic, resilient, curved thermostat, disposed in substantially a circumferential position about said shaft and carrying a detent device internally mounted thereon, between the ends thereof, and shaped to restrain movement of said member and connected shaft in one direction until operative thermal energization of said thermostat, and to permit movement of said member and shaft in the opposite direction; means, mounted concentrically with said shaft, adapted to tension said member for movement and in engagement with said detent, and including a locking latch for said means; and a reinforcing arrangement for said thermostat embodying, coöperatively with an inwardly turned portion of the thermostat at its free end, a stationary support positioned to be engaged by such free portion.

6. A thermostatically-controlled device comprising, in combination, a shaft mounted for oscillatory movement, with radial extensions to control the same;—a radial member fixedly mounted on said shaft and arranged to engage a detent device;—a bi-metallic, resilient, curved thermostat, disposed in substantially a circumferential position about said shaft and carrying a detent device internally mounted thereon, between the ends thereof, and shaped to restrain movement of said member and connected shaft in one direction until operative thermal energization of said thermostat, and to permit movement of said member and shaft in the opposite direction; means mounted concentrically with said shaft, adapted to tension said member for movement and in engagement with said detent, and including a locking latch for said means; and a reinforcing arrangement for said thermostat embodying, cooperatively with an inwardly turned portion of the thermostat at its free end, a stationary support positioned to be engaged by such free portion, the coöperative arrangement and position of said support and said portion of the thermostat being such that operative thermally-caused movement of the thermostat is substantially unrestrained and further such that the lines of pressure of the thermostat on said support and of the said member on said detent are substantially parallel.

7. A thermostatically-controlled device comprising, in combination, a shaft mounted for oscillatory movement;—a radial member rigidly mounted thereon and carrying at an outer end a latch extension with spring tension means to maintain it in radial position and arranged for swinging retraction in one direction; a double-ended radial lever structure concentrically mounted on said shaft, arranged for movement independently thereof, having a resilient connection thereto, and a locking latch adapted to lock said lever at an extreme position; means to limit the relative movements of said shaft and lever structure;—and a controlling thermostat for the device, arranged and mounted substantially circumferentially of said shaft and carrying a detent interiorly mounted thereon, at a location removed from said extreme position of said lever and on a free portion of the thermostat, positioned and shaped operatively to engage said latch extension and to retract from engagement upon thermal energization of said thermostat.

8. In a thermostatically-controlled device having an oscillatory shaft and a radial member rigidly mounted thereon and arranged to engage a detent device controlled by and mounted on a thermostat, in combination, a bracket support for the thermostat with means to rigidly position the same, said means being eccentric with the shaft and arranged to permit movement of said support in a plane at right angles to the shaft axis, and a thermostat fixedly mounted at one end on said bracket, arranged generally circumferentially with regard to said shaft, and carrying a detent device inwardly mounted on the thermostat and positioned to be varied in engagement with said radial member by adjustment of said bracket support.

9. In a thermostatically-controlled device having an oscillatory shaft and a radial member rigidly mounted thereon and arranged to engage a detent device controlled by and mounted on a thermostat, in combination, a bracket support for the thermostat, with means to rigidly position the same, said means being eccentric with the shaft and arranged to permit movement of said support in a plane at right angles to the shaft axis, and a thermostat fixedly mounted at one end on said bracket, arranged generally circumferentially with regard to said shaft, and carrying a detent device inwardly mounted on the thermostat and positioned to be varied in engagement with said radial member by adjustment of said bracket support; together with a reinforcing arrangement for said thermostat embodying an inwardly turned conformation of the free part thereof and a supporting stud also fixedly mounted on said bracket; the coöperative arrangement and position of said support and said portion of the thermostat being such that operatively thermally-caused movement of the thermostat is substantially unrestrained and further such that the lines of pressure of the thermostat on said support and of the said member on said detent are substantially parallel.

10. Locking means for releasably holding a pivoted lever against swinging movement in one direction, embodying in combination with a stationary lock stud; a coöperative latch member pivoted on said lever and having lost motion engagement therewith to permit limited locking movement relative thereto, and a spring to maintain said member in a normal position relative to said lever;—said member further having a hooked portion adapted to pass into locking engagement with said stud when said member is normally positioned, thereby to hold said lever from its said swinging movement; and an operating arm carried by said member and extending approximately radially to both the pivot of said member and the pivot of said lever, whereby actuation of said arm in said direction, first rocks said member for release from said stud and then imparts to said lever its said swinging movement.

11. In a hinge-latch structure the combination with a plate mounted for edgewise movement designed to be restricted in only one direction by the latch; of a pivot stud extending substantially at right angles through said plate and on either side thereof, said stud being fixedly mounted to said plate near the extremity of a projecting portion of the latter; a U-shaped, hinge-latch member, formed to present a stop engaging face at its yoked portion, and arranged to straddle said extremity of the projecting portion, and also to have a freely rotatable bearing on said pivot stud at each side of said plate portion; a spring coiled loosely about an extended portion of said stud adjacent to one side of said latch member,—said spring being anchored at one end to said stud, and at its other end to said member, thereby acting to maintain said latch member yieldingly in a stop limited position with said stop-engaging face projecting from the path of movement of said plate.

12. In a type of thermostatic-detent, governing-apparatus wherein a pivoted element tensioned for rotative movement is adapted to be restrained by engagement with an intercepting stop projection carried by a laminated leaf thermostat and adapted to be retracted thereby from intercepting engagement with said element, the combination, with said thermostat; of a supporting bracket therefor pivoted eccentrically of the axis of rotation of said element, and arranged to be adjustable about its pivot for varying the degree of engagement between said element and said stop.

13. In thermostatic detent controlling apparatus, in combination, a movable controlled member, means to tension said member for movement; a laminated thermostatic spring, mounted rigidly at one portion and having a free portion adapted to flex responsively to thermal change; a detent mounted on said free portion, thereby to be moved into and out of a position to engage with and to restrain said member; together with constraining means for said thermostat, arranged freely to permit the natural heat caused movement thereof, but positioned positively to restrict mechanical distortion of said thermostat as caused by the pressure of said member on the restraining detent.

14. In a thermostatically-controlled device, in combination, an oscillatory member, with control means therefor; a concentrically pivoted member adapted for positive engagement with said oscillatory member in one direction and carrying an extension arranged to yield in one direction only; resilient means connecting said oscillatory member and said concentrically pivoted member; a thermostatic structure including a single, bi-metallic, laminated, curved, resilient thermostat, rigidly mounted at one end, circumferentially disposed about the center of oscillation of said concentrically pivoted member, and having an inwardly projecting spur arranged normally to lie in the path of movement of said extension of said concentrically pivoted member and to receive the thrust of said member; and a roller abutment positioned internally adjacent to said thermostat near the free end thereof and so related to the form of the thermostat in this portion that when said thermostat is in contact with said roller, a line drawn normal to the surfaces in contact will be substantially parallel to the direction of thrust of said concentrically pivoted member upon said spur.

15. In combination; an element tensioned for movement; a stop normally positioned to engage with said element to prevent said movement; a laminated leaf thermostat structure carrying said stop fixedly mounted thereon, and itself mounted for flexure in a direction to retract said stop from engagement with said element;—said element, said stop, and said thermostat being so coöperatively positioned and arranged that heat-caused flexure of said thermostat, and the flexure thereof caused by pressure of said element on said stop, cause movements of a portion of the thermostat structure in respectively different directions; and a stationary reinforcing abutment positioned for engagement with said portion of the thermostat and freely to permit said heat caused flexure, but positively to restrict said pressure-caused flexure, of the thermostat.

16. A thermostatically-controlled device comprising, in combination, a bi-metallic, resilient thermostat rigidly mounted at one end and operatively unconstrained at the other and free end;—a detent device mounted on said thermostat; a movable member, tensioned for movement, and arranged to engage said detent, the coöperative engagement being such that the pressure of said tensioned member tends to move said thermostat and its carried detent substantially parallel with the thermally caused movement thereof; and a reinforcing arrangement for said thermostat embodying a stationery support and a coöperative conformation of the thermostatic structure, mutually positioned and arranged to engage when the tensioned member operatively engages said detent, the coöperative conformation and position being such that designed thermally-caused movement of said thermostat is unconstrained by said support and such that the lines of pressure of the thermostatic structure on said support and of said member on said detent are substantially parallel; said mounted portion of the thermostat being so related to the direction of pressure upon said thermostat due to said tensioned member that said direction of pressure shall fall out of alinement with said mounted portion of the thermostat and out of the path of movement of said tensioned member.

17. A thermostatic structure embodying a single, laminated, bi-metallic, resilient thermostat, rigidly mounted at one portion and arranged at another portion to receive the thrust of a loaded, movable member in such direction that said thrust falls out of alinement with said rigidly mounted portion of the thermostat and out of the path of movement of said loaded member, together with means for constraining the thermostat at a free portion of the latter, comprising an anti-friction abutment lying out of the path of thermally caused movement of said free portion but in the path of mechanically caused movement thereof, due to flexural yielding of said thermostat under said thrust of said loaded, movable member.

18. In a thermostatically-controlled device, in combination, a tensioned, movable member, a detent member arranged for movement into and out of the path of said movable member, a bi-metallic, resilient thermostat mounted at one portion and having a free portion thereof operatively related to said detent member, and arranged to receive the thrust of said tensioned movable member upon operative engagement of the latter with said detent member; together with a constraining abutment coöperating with a free portion of the thermostatic structure to reinforce said structure against flexure due to said thrust and to lie out of the path of the designed thermally caused movement of said free portion of the thermostatic structure.

19. In combination with a thermostatically controlled device including a member tensioned for movement and means thereon arranged to engage a movable detent to restrict said movement; a bi-metallic, bowed, thermostat rigidly mounted at one end and operatively unrestrained at its free end to permit thermally caused flexure in an intermediate portion of the thermostat, said portion of the thermostat carrying said detent fixed thereto;—the coöperative arrangement of said detent and of said rigidly mounted end of the thermostat relative to the direction of the pressure exerted on said detent by said member when the latter is restrained thereby, being such that said pressure acts substantially away from the free end of the thermostat and in a line of direction tending to cause the bowed thermostat to straighten.

20. In combination; a power impelled member to be restrained from movement; a detent mounted as a projection on a laminated thermostatic leaf spring and positioned to be movable by natural resilient flexure of said spring into a position for engagement with said member thereby to restrain the latter;—the disposition of said thermostatic spring, with its mounting, relative to the line of pressure of said member on said detent being such that retractive movement of said detent from the path of said member as caused by natural resilient flexure in said spring is appreciably similar in direction to said line of pressure, so that a component of the force of said pressure tends to retract said detent through natural yielding flexure in said thermostat, thereby automatically to relieve the latter from excessive distortion.

Signed in Boston, Massachusetts, this 22nd day of July, 1916.

RAYMOND D. SMITH.

Witnesses:
E. L. McFADDEN,
J. E. BLACKMAN.